(12) United States Patent
Asama et al.

(10) Patent No.: US 7,081,731 B2
(45) Date of Patent: Jul. 25, 2006

(54) TRANSLATORY ACTUATOR UNIT

(75) Inventors: Hajime Asama, Wako (JP); Kuniaki Kawabata, Wako (JP); Hayato Kaetsu, Wako (JP); Kazuhiro Kosuge, Wako (JP); Yasuhiro Hirata, Wako (JP)

(73) Assignee: RIKEN, Saitama (JP)

( * ) Notice: Subject to any disclaimer, the term of this patent is extended or adjusted under 35 U.S.C. 154(b) by 264 days.

(21) Appl. No.: 10/830,040

(22) Filed: Apr. 23, 2004

(65) Prior Publication Data
US 2004/0215370 A1 Oct. 28, 2004

(30) Foreign Application Priority Data
Apr. 24, 2003 (JP) ............................. 2003-119930

(51) Int. Cl.
*G05B 11/01* (2006.01)
(52) U.S. Cl. .................. 318/635; 318/567; 318/560; 318/569
(58) Field of Classification Search ................ 318/635, 318/567, 560, 563, 566, 568.6, 569, 568.24, 318/600, 650
See application file for complete search history.

(56) References Cited

U.S. PATENT DOCUMENTS

| | | | |
|---|---|---|---|
| 6,415,191 B1 * | 7/2002 | Pryor | ............................ 700/95 |
| 2003/0146938 A1 * | 8/2003 | Geiger | ........................ 345/784 |

* cited by examiner

*Primary Examiner*—Karen Masih
(74) *Attorney, Agent, or Firm*—Griffin & Szipl, P.C.

(57) ABSTRACT

A translatory actuator unit including a translatory actuator module that moves an object straightly, a force sensor that detects a load applied to the translatory actuator module, and a servo control module that controls a speed, a position and/or output power of the translatory actuator module. The translatory actuator module, the force sensor and the servo control module are integrally configured. The servo control module has a two-way network means of receiving a control command concerning the speed, the position and/or the output power from a network, and transmitting information of the speed, the position and/or the output power to the network, a control means of controlling the speed, the position and/or the output power, and a self-diagnosis means of confirming safety and detecting an abnormal state based on detected information of the speed, the position, the load, and/or an electric current of the translatory actuator module.

5 Claims, 5 Drawing Sheets

US 7,081,731 B2

TRANSLATORY ACTUATOR UNIT

This application claims priority from Japanese Patent Application No. 2003-119930, filed Apr. 24, 2003, the entire disclosure of which is incorporated herein by reference.

BACKGROUND OF THE INVENTION

1. Field of the Invention

The present invention relates to a translatory actuator unit that can receive an operating command via a network.

2. Description of the Related Art

Recently, a robot technology has been developed, and a force control technology using a force sensor has attracted considerable attention. In the field of welfare and nursing care, by using the force control technology, care equipment can cooperate with a person to perform care working.

A care bed, standing assist equipment, wheelchair and so on have been known as care equipment. When a person who needs nursing care or a care giver uses his or her force, such care equipment assists the person to promote self support, or assist the care giver to reduce a load of the care giver.

A kind of a lift as clinical support equipment is commercially available (disclosed in the following Reference 1). However, such clinical support equipment was developed for use by a care giver. The clinical support system can reduce a load of a care giver, but it is difficult for a person who needs nursing care to use the clinical support equipment to obtain support.

[Reference 1]

"http://www.hcr.or.jp/english.html".

A system in which a robot arm is set in a rail on a ceiling (see the following Reference 2), and a walking support system having a mechanism that moves on a ceiling by making the ceiling of an iron steel and using a permanent magnet (see the following Reference 3) are developed as a system for promoting clinical self-support of a person who needs nursing care.

[Reference 2]

N. Suzuki, et al. "System assisting walking and carrying daily necessities with an overhead robot arm for in-home elderlies", Proc. Of the 22$^{nd}$ Annual Int'l Conf. of the IEEE Engineering in Medicine and Biology Society, Vol. 3, pp 2271–2274, 2000.

[Reference 3]

"Function and Safety Measure of Walking Assist System Hanging on Ceiling", Preliminary Draft Collection of Japanese Robot Society, 1L19, 2002, author: Sugimoto, et al.

However, in order to attach these systems to a normal house, the house needs to be greatly improved so as to be suitable to the systems. Meanwhile, a relatively small clinical support system is proposed (see the following Reference 4), but this system is operated by a joystick. It is necessary to establish concreteness of how to operate the system and who operates the system.

[Reference 4]

"Moving Support Equipment Aiming to Promote Self-Support Ability", 45$^{th}$ Automatic Control Association Lecture, pp. 319–320, 2002, author: Okawai, et al.

Furthermore, power assist clinical support system driven by a wire is proposed. Research is performed on a clinical support method in which an appropriate clinical support is given in accordance with a state of a user (see Reference 5). It is very effective to give clinical support in accordance with a force applied to the system by the user. However, there is a problem in that this clinical support system becomes relatively large.

[Reference 5]

"Experimental Review Regarding Method of Controlling Power Assist Equipment for Self-Support Movement", 8$^{th}$ Robotics Symposia, pp. 136–141, 2003, author: Nagai, et al.

Meanwhile, a computer communication such as an Internet has been recently developed, and it is proposed to drive and control a remote apparatus via a network (see the following References 6 and 7, for example).

[Reference 6]

Japanese Laid-Open Patent Publication No. 2002-159760.

[Reference 7]

Japanese Laid-Open Patent Publication No. 2003-18569.

According to "System and Method for Driving Toy via Network" of Reference 6, as shown in FIG. 1, the system includes a plurality of communication servers 50 and 53 that provide message information by computer communication on a network, a plurality of driving devices 51 and 54 that receives the message information from the communication servers 50 and 53 and analyze the message information, and a plurality of toys 52 and 55 that receive input message information from the driving devices 51 and 54 and move or output character information, audio information or video information. Thus, a specific movement or audio is realized by this system in accordance with message information provided by the computer communication.

According to "Method and Apparatus for Controlling Mobile Object, and Storing Medium" of Reference 7, a user system 63, a viewing system 65, a mobile object system 62 and a shooting system 66 are connected via a communication line 64 such as the Internet. The mobile object is controlled by two-way communication.

A care bed that is care equipment is generally provided with 2 to 4 translatory actuators. Also, standing assist equipment (clinical system) and a wheelchair are often provided with a translatory actuator to perform rising and falling operation while supporting weight of a person who needs support.

Conventionally, in order to configure force control system using a translatory actuator, it was necessary to combine the actuator, a motor driver, a controller, a force sensor and the like that are separately developed. To avoid such combination, exclusive design is required, so that the extensibility becomes low, and the system inevitably becomes expensive.

Furthermore, to configure a system that further reduces a load of a care giver and a person needing care, it is desired to combine a plurality of care equipment (a bed system, a clinical system, a wheelchair, and so on). However, the conventional care equipment has no interface function, and it is necessary to configure an entire system.

SUMMARY OF THE INVENTION

The present invention was made to solve the above problems. It is an object of the present invention to provide a translatory actuator that has force control means and self-diagnosis means, by which a plurality of the translatory actuator units and equipment having the actuator unit can be controlled via a network, and high safety, reliance, versatility, extensibility, easy system formulation, and cost reduction can be achieved.

According to the present invention, there is provided a translatory actuator unit comprising: a translatory actuator module that moves an object straightly; a force sensor that detects a load applied to the translatory actuator module; and a servo control module that controls a speed, a position and/or output power of the translatory actuator module, wherein the translatory actuator module, the force sensor and the servo control module are integrally configured, and the servo control module has two-way network means for receiving a control command concerning the speed, the position and/or the output power from a network, and transmitting information of the speed, the position and/or the output power to the network, control means for controlling the speed, the position and/or the output power, and self-diagnosis means for confirming safety and detecting an abnormal state based on detected information of the speed, the position, the load, and/or an electric current of the translatory actuator module.

In this configuration, the translatory actuator module, the force sensor and the servo control module are integrally configured, so that by using the translatory actuator unit, it is possible to easily configure a system that uses force control. For example, in the field of welfare and nursing care, it is possible to realize appropriate force control for a system that is performed based on assist by person's force and based on a force applied by a person.

Further, since the servo control module has the two-way network means, combination of a plurality of the translatory actuator units can be used. Thereby, various assist systems can be configured. Since the translatory actuator module, the force sensor and the servo control module are unified, the translatory actuator unit has very high extensibility. Therefore, system modification and extension can be easily made.

In addition, since the translatory actuator unit has the self-diagnosis means for confirming safety and detecting an abnormal operation, it is possible to prevent power output larger than necessary power when supporting a person needing care.

According to one aspect of the present invention, the translatory actuator module comprises: a driving motor; a mechanism for converting rotational movement of the driving motor into translatory movement of the translatory actuator module; and an encoder that detects a rotational speed and/or a rotational angle of the driving motor.

In this configuration, for example, by using a trapezoid screw as a screw member, it is possible to realize the translatory actuator having a long stroke with a low cost. The encoder detects a rotational angle and/or a rotational speed of the driving motor, so that a position and/or a speed of the translatory actuator can be easily detected with a low cost.

According to another aspect of the present invention, the force sensor comprises an elastic supporting member that elastically supports the translatory actuator module at an opposite side to the object, and a displacement detector that detects displacement of the elastic supporting member.

By this configuration, it is possible to detect a force that is applied to the entire translatory actuator module. Further, for example, a spring is used as the elastic supporting member, and a variable resistor or a potentiometer is used as the displacement detector, so that power output of the translatory actuator can be easily detected with a low cost.

According to another aspect of the present invention, the servo control module comprises: a communication unit connectable to the network; a memory device that stores the control command from the network and stores an operation program; a microprocessor that controls the translatory actuator module based on the operation program, confirms safety and detects an abnormal state based on the detected information of the speed, the position, the load, and/or the electric current; an interface that converts a signal communicated between the microprocessor and the translatory actuator module and between the microprocessor and the force sensor; and a motor driver that converts a control signal from the microprocessor into a driving signal for the translatory actuator module.

In this configuration, since a command received from the network, and the operating program are stored in the memory device, the translatory actuator module can be controlled based on the operating program by using the microprocessor, the interface and the motor driver. Therefore, the operating program of the microprocessor is provided for the self-diagnosis means to confirm safety and detect an abnormal operation based on the detected information of the speed, the position, the load, and/or an electric current of the translatory actuator module.

Furthermore, according to the present invention, there is also provided care equipment comprising the above-described translatory actuator unit.

Other objects, features and advantages of the present invention will become apparent from the following description with reference to the attached drawings.

DESCRIPTION OF THE PREFERRED EMBODIMENTS

Figure 1:
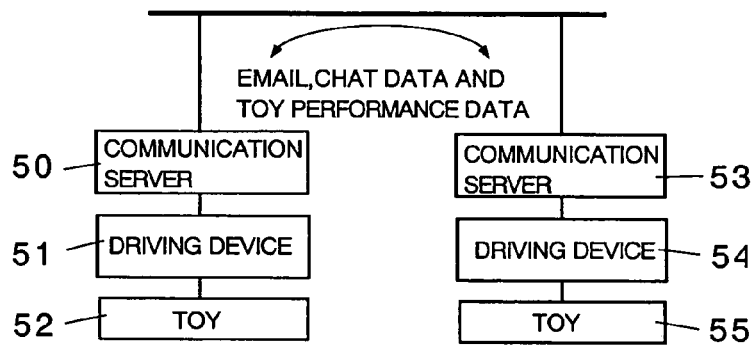
FIG. 1 shows a system configuration in the prior art.
Figure 2:
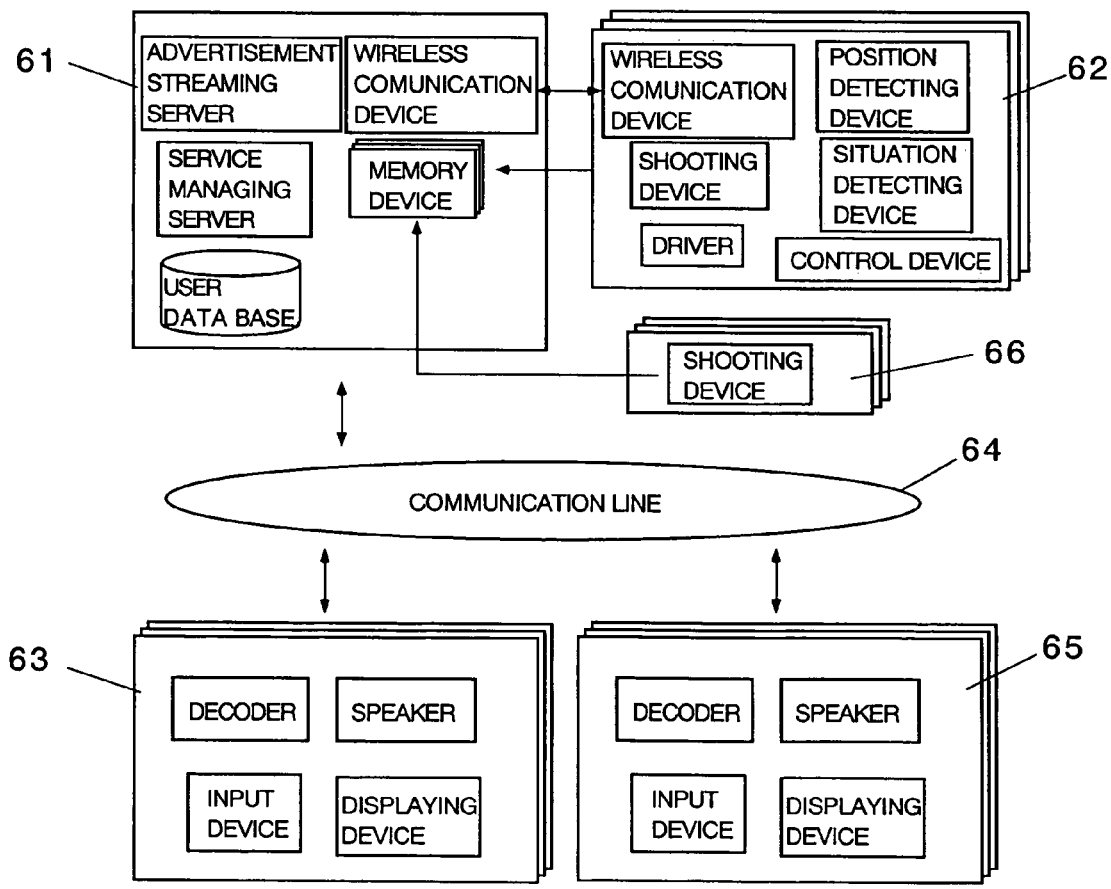
FIG. 2 shows another system configuration in the prior art.

In the following, one embodiment of the present invention will be described with reference to the drawings, and the same reference numerals are attached to the same or corresponding parts in the drawings.

Figure 3:
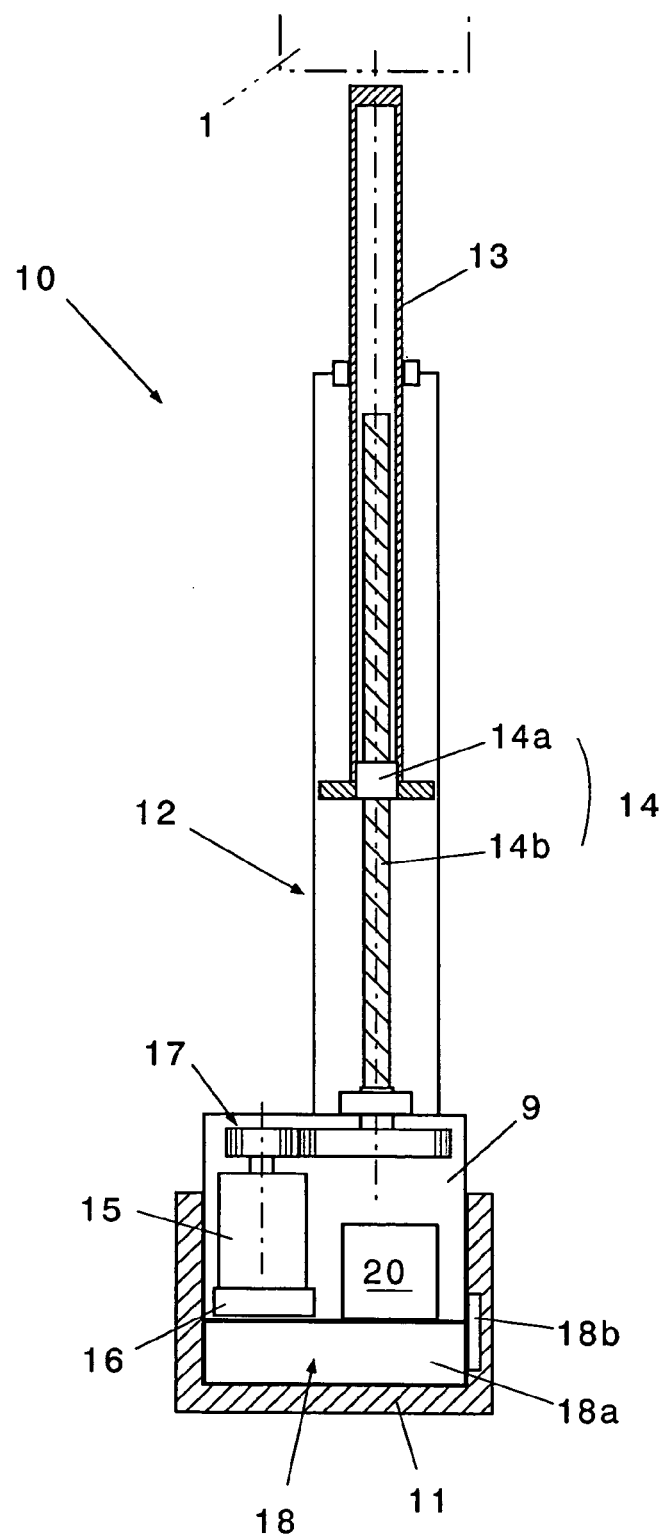
FIG. 3 shows a translatory actuator unit according to an embodiment of the present invention.

FIG. 3 shows a configuration of a translatory actuator unit (straight moving actuator unit) according to an embodiment of the present invention. As shown in FIG. 3, the translatory actuator unit 10 according to the embodiment of the present invention includes a translatory actuator module 12, a force sensor 18 and a servo control module 20 that are integrally configured.

The translatory actuator module 12 includes a thin long driving rod 13, a translatory module 14, a driving motor 15, and an encoder 16. The driving rod 13 extends in a direction of moving an object 1 straightly. The translatory module 14 includes a nut member 14a that is attached to the driving rod 13, and a thin long screw member 14b that engages the nut member 14a. The driving motor 15 rotates the screw member 14 around its axis. The encoder 16 detects a rotation angle of the driving motor 15.

The object 1 is, for example, a part of a care bed for a person who needs nursing care, and is connected to a front end part of the driving rod via an appropriate front end member (not shown in the drawing). A supporting member 11 that supports the translatory actuator module 12 is connected to a frame of the care equipment (e.g., the care bed) via an appropriate connecting member (not shown).

The driving rod 13 is a hollow cylindrical pipe. The front end part of the hollow cylindrical pipe is closed, and the nut member 14a is connected to the rear end part of the hollow cylindrical pipe. The screw member 14b is preferably a trapezoid screw. However, when high accuracy is required, the screw member 14b may be a ball screw.

A mechanism other than a screw may be used as the translatory module 14. For example, a rack and pinion drive may be used as the translatory module 14.

The driving motor 15 is preferably a servo motor. In this example, the driving motor 15 drives the screw member 14b via a mechanical reduction gear 17. The encoder 16 is preferably built in the driving motor 15 or integrated with the driving motor 15 to detect a rotation angle of the driving motor 15. The encoder 16 may be an absolute encoder or an incremental encoder. Instead of the driving motor 15 and the encoder 16, a pulse motor may be used.

As shown in FIG. 3, the translatory module 14, the driving motor 15 and the encoder 16 are housed in the same module body 9.

The force sensor 18 includes an elastic supporting member 18a and a displacement detector 18b. The elastic supporting member 18a elastically supports the translatory actuator module 12 at the opposite side to the object 1. The displacement detector 18b detects displacement of the elastic supporting member 18a.

The supporting member 11 has a concave part that receives and holds a base part of the module body 9 such that the module body 9 can move upwards and downwards. The elastic supporting member 18a is held between the base part of the module body 9 and the supporting member 11, and is pressed downwards by a reaction force of the translatory actuator module 12.

The elastic supporting member 18a is a compressed spring, for example, and the displacement detector 18b is a variable resistor or a potentiometer, and detects displacement of the elastic supporting member 18a. Accordingly, the displacement detector 18b detects displacement of the translatory actuator module based on the displacement of the elastic supporting member 18a. Other known sensor such as a load cell may be used as the force sensor 18.

Figure 4:
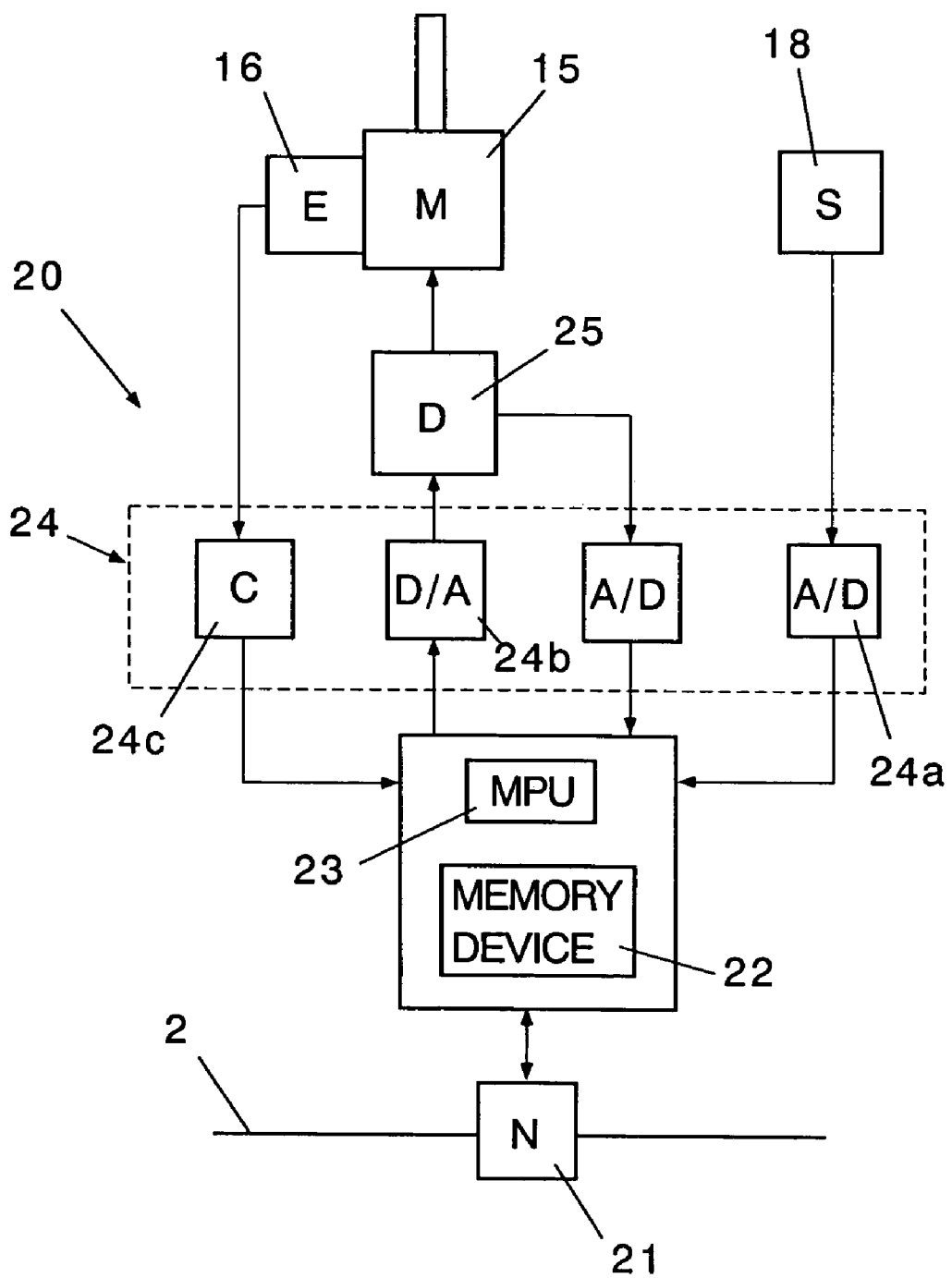
FIG. 4 shows a configuration of a servo control module shown in FIG. 3.

FIG. 4 shows a configuration of the servo control module 20 shown in FIG. 3. As shown in FIG. 4, the servo control module 20 includes a communication control unit 21, a memory device 22, a microprocessor 23, an interface 24, and a motor driver 25.

The communication unit 21 is preferably connected, via a local area network LAN, to computers constituting other care systems similar to the care system of FIG. 4. The memory device 22 is a RAM, a ROM, a flash memory or other memory media that store an operation program and a command received from a network.

The interface 24 includes an analog-to-digital converter 24a, a digital-to-analog converter 24b, a counter 24c and the like. The interface 24 converts a signal communicated between the microprocessor 23 and the encoder 16 of the translatory actuator module 12, between the microprocessor 23 and the motor driver 25, and between the microprocessor 23 and the force sensor 18. The motor driver 25 converts a control signal transmitted from the microprocessor 23 into a driving signal of driving the motor 15.

The microprocessor 23 includes a built-in CPU, and controls the motor 15 of the translatory actuator module 12 based on the operation program stored in the memory device 22. While controlling the motor 15, the microprocessor 23 confirms safety and detects an abnormal state based on a force detected by the force sensor 16, a speed and a position output by the encoder 16, and a current value received from the motor driver 25.

In order to confirm safety, when detecting a force exceeding a force (e.g., about 100 kg) necessary for supporting weight of a person needing care, the operation of the translatory actuator unit is stopped to secure safety of this person. To detect an abnormal state, for example, when a current value of the motor 15 is larger than a normal value, the microprocessor 23 determines abnormal operating of the translatory actuator unit.

The communication unit 21, the memory device 22 and the microprocessor 23 may be integrated as a computer (PC).

Figure 5:
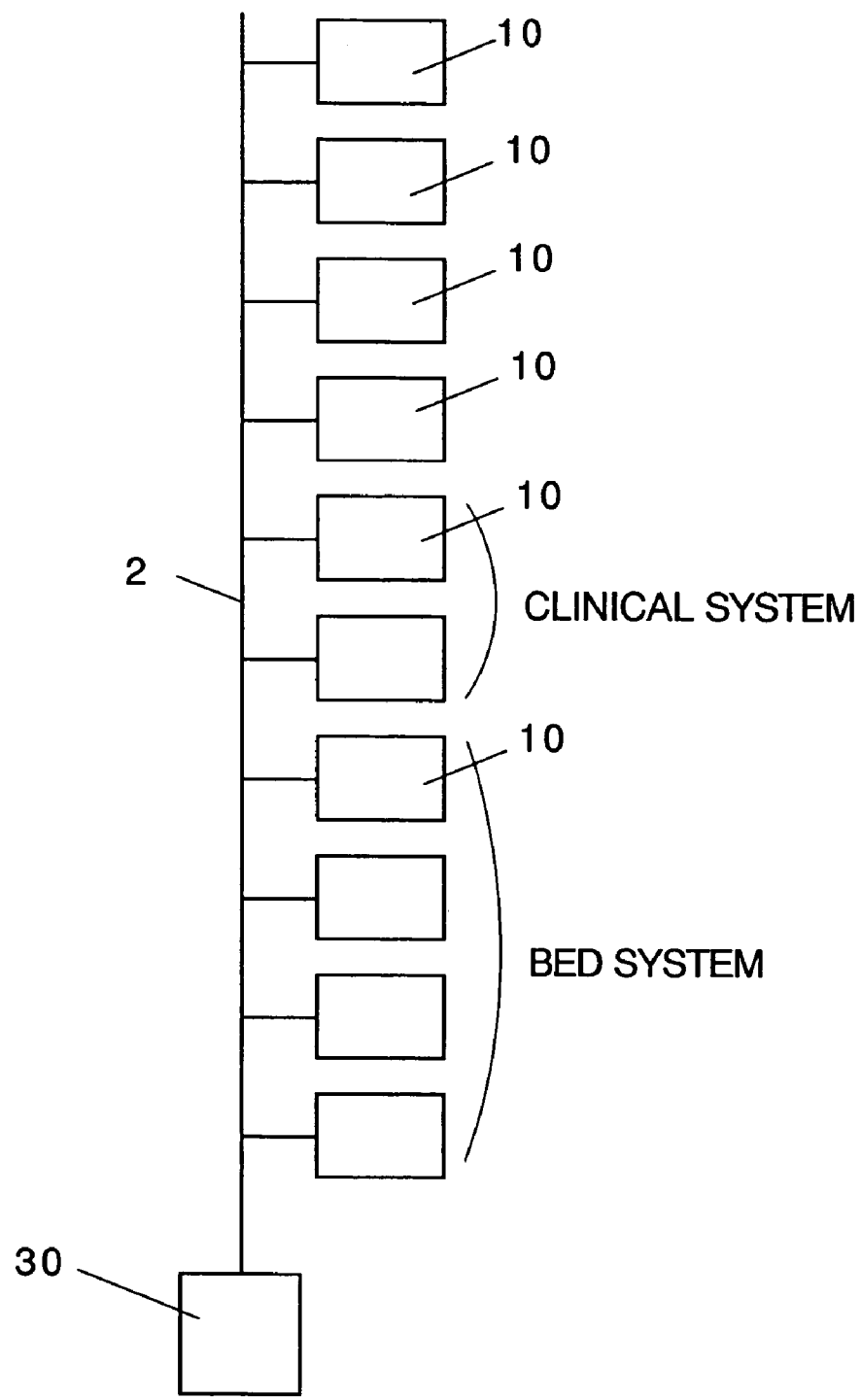
FIG. 5 shows a network system using the actuator unit of FIG. 3 according to the embodiment of the present invention.

FIG. 5 shows a network system that uses the translatory actuator unit according to the embodiment of the present invention. In FIG. 5, a plurality of actuator units 10 are connected to an upper-level computer 30 via the same local area network LAN 2. For example, a plurality of actuator units 10 constitute a bed system, and other plurality of actuator units 10 constitute a clinical system. The actuator unit 10 can be used for various care equipment (a bed system, a clinical system, a wheelchair and others).

Each actuator unit 10 independently functions as two-way network means and self-diagnosis means, and in each actuator unit 10, the translatory actuator module is controlled based on the operation program stored in the memory device to secure safety and detect an abnormal state based on detected force, speed, position, a current value, and the like.

The upper-level computer 30 functions as means for transmitting a command value to each translatory actuator unit 10 via the LAN 2. If necessary, the upper-level computer 30 may function as means for rewriting a program in each actuator unit 10. Meanwhile, the servo control module 20 (e.g., the communication unit 21) of the translatory actuator unit 10 may function as two-way network means for receiving a control command concerning the speed, the position and/or the output power of the translatory actuator module 12, via a network (e.g., LAN 2) from the upper-level computer 30, and transmitting information of the speed, the position and/or the output power of the translatory actuator unit 10, via the network (e.g., LAN 2) to the upper-level computer 30. Thereby, based on the information received from the communication unit 21, the upper-level computer 30 may transmit a command to the communication unit 21, and rewrite the program stored in the memory device 22.

According to the embodiment of the present invention, the translatory actuator module 12, the force sensor 18 and the servo control module 20 are integrally configured. By using the translatory actuator unit having such an integral configuration, it becomes possible to easily configure a system using force control. For example, in the field of welfare and nursing care, it is possible to realize appropriate force control of the system based on information of a force for assisting a person and a force applied by a person.

Further, since the servo control module functions as the two-way network means, a plurality of translatory actuators can be combined for use, so that various assist systems can be configured. Since the translatory actuator module, the force sensor and the servo control module are integrated to configure the translatory actuator unit, the translatory actuator unit has very high extensibility, so that modification or extension of the system can be easily made.

In addition, since the translatory actuator unit also functions as the self-diagnosis means for confirming safety and detecting an abnormal state, it is possible to prevent generation of a force larger than a force necessary for supporting a person needing care, for example, and detect an abnormal operation in an early stage.

In the following, a method for controlling a translatory actuator according to embodiment of the present invention will be described.

In the translatory actuator unit according to the embodiment of the present invention, the translatory actuator module and the servo control module are integrally configured, and the force sensor using the elastic supporting member is installed at a lower part of the translatory actuator unit. Since an elastic member is used for the elastic supporting member, when a force is applied to the translatory actuator module, the elastic member is deformed, so that a flange of the force sensor as well as the translatory actuator module are displaced. An amount of this displacement is detected by a potentiometer to detect a force generated at the translatory actuator. When "$\Delta X_p$" designates a displacement amount of the potentiometer, a force "f" applied to the translatory actuator is obtained by the following equation 1:

$$f = k_p \Delta x_p \qquad \text{[Equation 1]}$$

in which $k_p$ designates a stiffness coefficient.

In order to realize a power assist system such as a clinical assist system, a method for controlling the translatory actuator based on a force applied to the actuator will be described as one example. It is assumed that the motor installed in the translatory actuator is driven by the motor driver, and a shaft of the motor rotates at an instructed target angular speed. On this assumption, the translatory actuator is controlled so as to satisfy the property of following Equation 2.

$$f = d(\dot{x} - \dot{x}_d) + k(x - x_d) \qquad \text{[Equation 2]}$$

Figure 6:
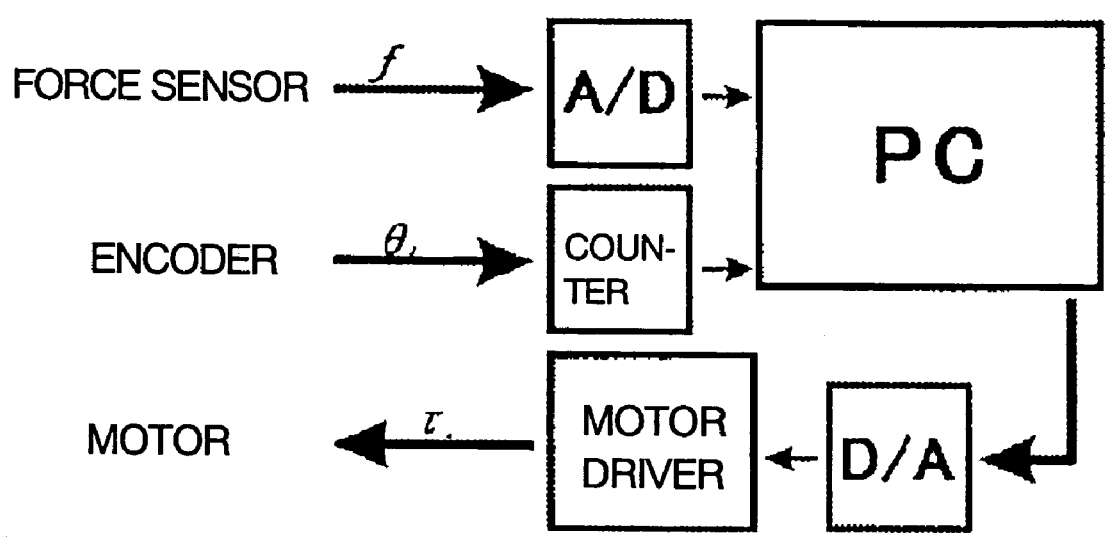
FIG. 6 shows one example of a configuration in the tralslatory actuator according to the embodiment of the present invention.

In which "d" designates a viscosity coefficient, "k" designates a stiffness coefficient, "x" designates a actual trajectory of the translatory actuator, and "$x_d$" designates a target trajectory of the translatory actuator. By using this control system, as shown in FIG. 6, it is possible to move the translatory actuator based on a force applied by a user. Further, a target trajectory, a viscosity coefficient, a stiffness coefficient and so on can be determined in accordance with characteristics of a user to realize appropriate clinical support. Furthermore, by using a method of a neural network and the like, a target trajectory and each parameter can be changed in a real time in accordance with a force applied by a user. In this manner, it is possible to realize support based on a force applied by a user.

As described above, by the translatory actuator unit according to the present invention, it is possible to control a plurality of care equipment via a network. Furthermore, the translatory actuator unit according to the present invention has excellent advantages of high safety, reliance, versatility, and extensibility, so that cost reduction can be achieved.

The present invention is not limited to the above-described embodiment, and various modifications can be made without departing from the scope of the present invention.

What is claimed is:

1. A translatory actuator unit comprising:
   a translatory actuator module that moves an object straightly;
   a force sensor that detects a load applied to the translatory actuator module; and
   a servo control module that controls a speed, a position and/or output power of the translatory actuator module,
   wherein the translatory actuator module, the force sensor and the servo control module are integrally configured,
   the servo control module has
   two-way network means for receiving a control command concerning the speed, the position and/or the output power from a network, and transmitting information of the speed, the position and/or the output power to the network,
   control means for controlling the speed, the position and/or the output power, and
   self-diagnosis means for confirming safety and detecting an abnormal state based on detected information of the speed, the position, the load, and/or an electric current of the translatory actuator module.

2. The translatory actuator unit according to claim 1, the translatory actuator module comprising:
   a driving motor;
   a mechanism for converting rotational movement of the driving motor into translatory movement of the translatory actuator module; and
   an encoder that detects a rotational speed and/or a rotational angle of the driving motor.

3. The translatory actuator unit according to claim 1, wherein the force sensor comprises an elastic supporting member that elastically supports the translatory actuator module at an opposite side to the object, and a displacement detector that detects displacement of the elastic supporting member.

4. The translatory actuator unit according to claim 1, wherein the servo control module comprises:
   a communication unit connectable to the network; a memory device that stores the control command from the network and stores an operation program;
   a microprocessor that controls the translatory actuator module based on the operation program, confirms safety and detects an abnormal state based on the detected information of the speed, the position, the load, and/or the electric current;
   an interface that converts a signal communicated between the microprocessor and the translatory actuator module and between the microprocessor and the force sensor; and
   a motor driver that converts a control signal from the microprocessor into a driving signal for the translatory actuator module.

5. Care equipment comprising a translatory actuator unit that includes a translatory actuator module that moves an object straightly;
   a force sensor that detects a load applied to the translatory actuator module; and
   a servo control module that controls a speed, a position and/or output power of the translatory actuator module,
   wherein the translatory actuator module, the force sensor and the servo control module are integrally configured,
   the servo control module has
   two-way network means for receiving a control command concerning the speed, the position and/or the output power from a network, and transmitting information of the speed, the position and/or the output power to the network,
   control means for controlling the speed, the position and/or the output power, and
   self-diagnosis means for confirming safety and detecting an abnormal state based on detected information of the speed, the position, the load, and/or an electric current of the translatory actuator module.

* * * * *